(12) United States Patent
Yousef

(10) Patent No.: US 7,782,982 B2
(45) Date of Patent: Aug. 24, 2010

(54) ADAPTIVE DEINTERLEAVER MEMORY ALLOCATION

(75) Inventor: Nabil Yousef, Foothill Ranch, CA (US)

(73) Assignee: Newport Media, Inc., Lake Forest, CA (US)

( * ) Notice: Subject to any disclaimer, the term of this patent is extended or adjusted under 35 U.S.C. 154(b) by 547 days.

(21) Appl. No.: 11/923,682

(22) Filed: Oct. 25, 2007

(65) Prior Publication Data

US 2009/0110118 A1    Apr. 30, 2009

(51) Int. Cl.
*H03D 1/24* (2006.01)
(52) U.S. Cl. .................. 375/320; 375/260; 375/262; 375/341; 704/242
(58) Field of Classification Search .................. 375/260, 375/262, 320, 341; 704/242
See application file for complete search history.

(56) References Cited

U.S. PATENT DOCUMENTS 7,519,872 B2 *   4/2009   Lee ........................... 714/701

* cited by examiner

*Primary Examiner*—Curtis B Odom
(74) *Attorney, Agent, or Firm*—Rahman LLC

(57) ABSTRACT

A receiver for use in a wireless network comprising a communications channel and a method of allocating deinterleaver memory usage in the receiver, wherein the receiver comprises a processor adapted to organize subchannels of the communications channel and set a number (N) of data bits per soft decision, wherein the soft decision is represented by N data bits; an address decoder adapted to decode the subchannels; a demapper adapted to receive QAM symbols and demap the QAM symbols to soft decisions; a deinterleaver adapted to perform deinterleaving on the soft decisions, wherein the deinterleaver comprises a memory component having a storage size that is a function of the number (N) of bits per soft decision; and a Viterbi decoder adapted to decode the deinterleaved soft decisions.

20 Claims, 4 Drawing Sheets

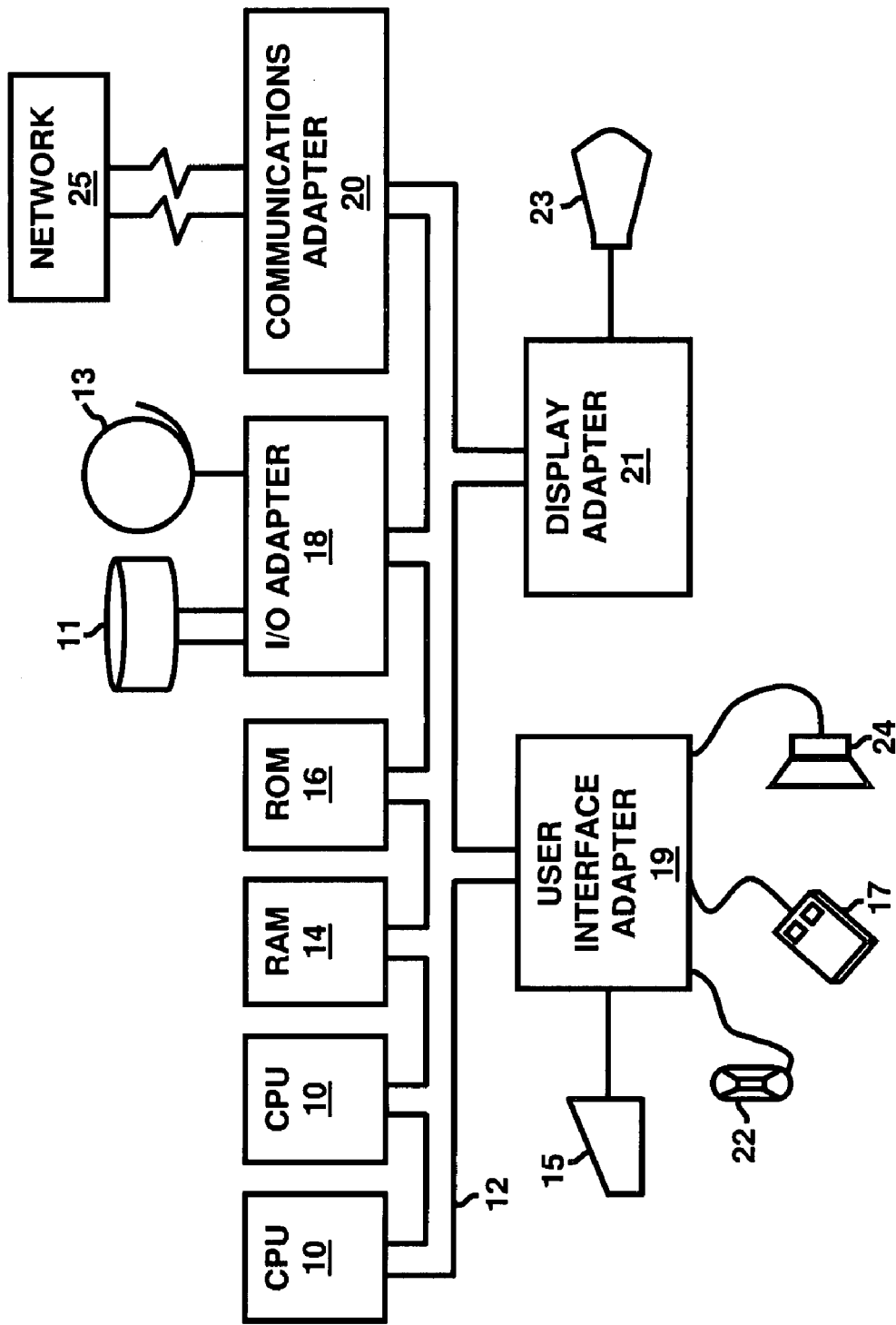

ADAPTIVE DEINTERLEAVER MEMORY ALLOCATION

BACKGROUND

1. Technical Field

The embodiments herein generally relate to wireless communication systems, and, more particularly, to mobile television (TV) technologies.

2. Description of the Related Art

As shown in FIG. 1, in many wireless communication channels 100, such as Terrestrial-Digital Multimedia Broadcasting (T-DMB), on the transmitter side, convolutional encoding (101) is applied on the transmitted data to provide robustness of transmission against transmission errors. To provide further immunity against burst errors, time interleaving (102) is used to spread the encoded bits over a wide time span. The interleaved bits are then mapped (103) to quadrature amplitude modulation (QAM) symbols that are then transmitted on the channel 100. At the receiver, the received QAM symbols are demapped (104) to soft decisions. Each soft decision is usually represented in hardware by N bits. Deinterleaving (105) is performed on the soft decisions which are then decoded to obtain the original transmitted data bits using a Viterbi decoder 106. The use of interleaving (102) makes the receiver more immune to burst errors because the burst errors on the physical channel will be spread by the deinterleaver 105 and reach the Viterbi decoder 106 as spread errors.

In T-DMB, for example, time interleaving is applied to each of the subchannels of the Main Service Channel (MSC). This time interleaving is used to spread the encoded bits over a wide time span. The receiver requires memory for the deinterleaver 105 to store the delayed bits in order to reverse the interleaving order. The required memory at the receiver is directly proportional to the number of bits (N) that the demapper 104 uses to represent each soft decision. For T-DMB, the receiver memory size is a significant portion of the entire receiver size (approximately 20 to 30%). Clearly, reducing N, and thus reducing the receiver cost, is highly desired. However, the performance of the receiver deteriorates with decreasing N, especially in fast fading channel conditions. Accordingly, there remains a need for a technique of reducing receiver memory requirements in wireless communications systems.

SUMMARY

In view of the foregoing, an embodiment herein provides a receiver for use in a wireless network comprising a communications channel, wherein the receiver comprises a processor adapted to organize subchannels of the communications channel and set a number (N) of data bits per soft decision, wherein the soft decision is represented by N data bits; an address decoder adapted to decode the subchannels; a demapper adapted to receive quadrature amplitude modulation (QAM) symbols and demap the QAM symbols to soft decisions; a deinterleaver adapted to perform deinterleaving on the soft decisions, wherein the deinterleaver comprises a memory component having a storage size that is a function of the number (N) of bits per soft decision; and a Viterbi decoder adapted to decode the deinterleaved soft decisions. The wireless network may comprise a MSC network. Alternatively, the wireless network may comprises an Integrated Services Digital Broadcasting-Terrestrial (ISDB-T) network, wherein when the receiver receives only one segment of channel spectrum, all unutilized memory is allocated to the Viterbi decoder.

Additionally, the processor may be adapted to organize the subchannels such that one subchannel occupies an entire common interleaved frame (CIF) of the communications channel, wherein the processor may be adapted to program N to be equal to 4. Furthermore, the processor may be adapted to organize the subchannels such that one subchannel occupies less than an entire CIF of the communications channel, wherein when the one subchannel occupies half of the entire CIF, then the processor may be adapted to program N to be equal to 8. Preferably, a value of the number (N) of bits per soft decision is variable according to the organization of the subchannels to CIFs of the communications channel. Moreover, the processor is preferably adapted to divide a total amount of the memory size amongst multiple subchannels.

Another embodiment provides a receiver for use in a wireless network comprising a communications channel, wherein the receiver comprises a host processor adapted to receive Fast Information Blocks (FIBs) from the communications channel, wherein the FIBs contain information about channel allocation; parse the FIBs to extract information about an actual channel allocation; and estimate a number of bits per soft decision (N) by dividing a total receiver available memory size by a number of soft bits for received subchannels of the communications channel. The receiver further comprises an address decoder adapted to decode the subchannels; a demapper adapted to receive QAM symbols and demap the QAM symbols to the soft decisions (N); a deinterleaver memory adapted to store the soft decisions (N), wherein a size of the deinterleaver memory corresponds to the number of bits per soft decision (N) when one subchannel occupies an entire CIF of the communications channel; a deinterleaver adapted to perform deinterleaving on the soft decisions (N); and a transmission link adapted to send the number of bits per soft decision (N) to the demapper, a Viterbi decoder, and the address decoder, wherein the address decoder is adapted to control how the soft decisions (N) are read from the deinterleaver memory and fed to the deinterleaver and the Viterbi decoder, and wherein the Viterbi decoder is adapted to decode the deinterleaved soft decisions. Preferably, the wireless network comprises any of a MSC network and an ISDB-T network, wherein in the ISDB-T network, when the receiver receives only one segment of channel spectrum, all unutilized memory is allocated to the Viterbi decoder.

Another embodiment provides a method of allocating deinterleaver memory usage in a receiver used in a wireless network comprising a communications channel, wherein the method comprises organizing, using a processor, subchannels of the communications channel to set a number (N) of data bits per soft decision, wherein the soft decision is represented by N data bits; decoding, using an address decoder, the subchannels; receiving, using a demapper, QAM symbols and demapping the QAM symbols to soft decisions; performing deinterleaving, using a deinterleaver, on the soft decisions, wherein the deinterleaver comprises a memory component having a storage size that is a function of the number (N) of bits per soft decision; and decoding, using a Viterbi decoder, the deinterleaved soft decisions.

The wireless network may comprise a MSC network. Alternatively, the wireless network may comprise an ISDB-T network, wherein in the ISDB-T network, when the receiver receives only one segment of channel spectrum, all unutilized memory is allocated to the Viterbi decoder. The method may further comprise organizing the subchannels such that one subchannel occupies an entire CIF of the communications channel, wherein the method may further comprise programming N to be equal to 4. Additionally, the method may further comprise organizing the subchannels such that one subchannel occupies less than an entire CIF of the communications channel, wherein when the one subchannel occupies half of the entire CIF, then the method may further comprise programming N to be equal to 8. Preferably, a value of the number (N) of bits per soft decision is variable according to the organization of the subchannels to CIFs of the communications channel. Moreover, the method may further comprise dividing a total amount of the memory size amongst multiple subchannels.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 4 is a schematic diagram of a computer system according to an embodiment herein.

DETAILED DESCRIPTION OF PREFERRED EMBODIMENTS

Figure 1:
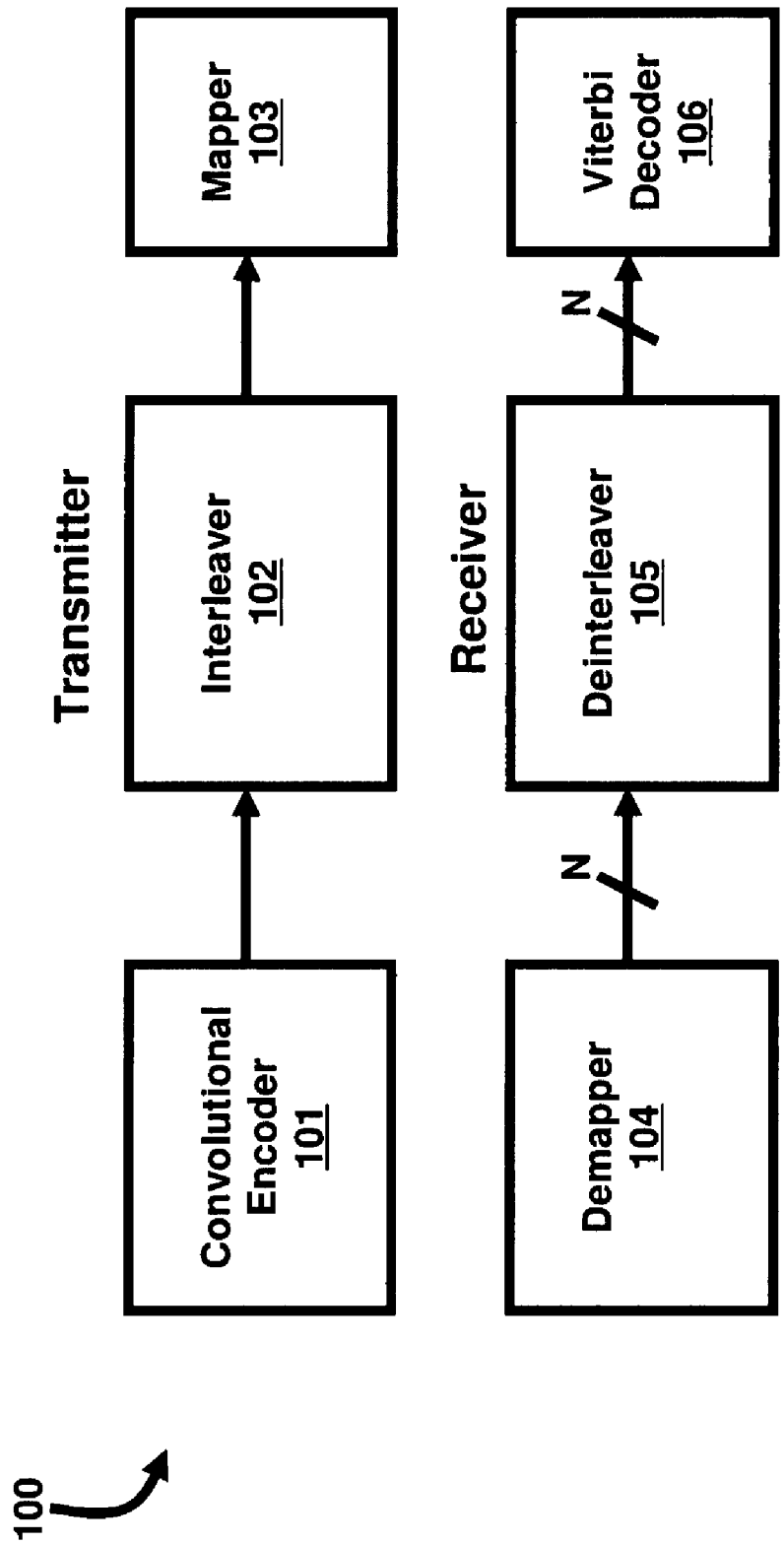
FIG. 1 illustrates a schematic diagram of a conventional wireless communications channel.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need to reduce receiver memory requirements in wireless communications systems. The embodiments herein achieve this by providing an adaptive technique for reducing the number of bits (N) that the demapper uses to represent each soft decision without affecting the performance of the receiver. Referring now to the drawings, and more particularly to FIGS. 1 through 4, where similar reference characters denote corresponding features consistently throughout the figures, there are shown preferred embodiments.

The example below describes an interleaving process for the T-DMB standard. However, it can directly apply to other standards using convolutional encoding and long time interleaving, such as Integrated Services Digital Broadcasting-Terrestrial (ISDB-T), for example. The convolution codeword (out of the convolution encoder 101 before the interleaver 102) $B_r$ is denoted as a vector of length $M_r$ as follows:

$$B_r = (b_{r,0}, b_{r,1}, \ldots, b_{r,i_r}, \ldots, b_{r,M_r-1})$$

The output of the interleaver 102 is denoted as a sequence $C_r$ of length $N_r$ as follows:

$$C_r = (c_{r,0}, c_{r,1}, \ldots, c_{r,i_r}, \ldots, c_{r,N_r-1})$$

where $N_r = M_r$ if no multiplex reconfiguration occurs.

Time interleaving is performed according to the following relation:

$$C_{r,i_r} = \begin{cases} b_{r',i_r} & \text{if } i_y \leq M_{y'} - 1 \\ 0 & \text{if not} \end{cases}$$

where the relation between r' and r is given as in the following table:

| $R(i_r/16)$ | $r'(r, i_r)$ |
|---|---|
| 0 | r |
| 1 | r-8 |
| 2 | r-4 |
| 3 | r-12 |
| 4 | r-2 |
| 5 | r-10 |
| 6 | r-6 |
| 7 | r-14 |
| 8 | r-1 |
| 9 | r-9 |
| 10 | r-5 |
| 11 | r-13 |
| 12 | r-3 |
| 13 | r-11 |
| 14 | r-7 |
| 15 | r-15 |

This means that the codeword is divided into groups of 16 bits with indices 0:15. The first bit (index 0) experiences no delay; bit number 1 is delayed by 8 Common Interleaved Frames (CIFs); bit number 2 is delayed by 4 CIFs, and so on as indicated in the table. Therefore, the memory needed by each 16 bit group is simply the sum of the delays of the 16 branch: Interleaver_memory_per_16_bit_group=sum ([0, 8, 4, 12, 2, 10, 6, 14, 1, 9, 5, 13, 3, 11, 7, 15])=120 bit.

Moreover, knowing that the input to the deinterleaver 205 is the soft decision values out of the demapper 204, the total memory required by the deinterleaver 205 can be calculated as: Deinterleaver_memory=(CIF_length*Interleaver_memory_per_16_bit_group/num_of_branches)*N, where N is the number of bits per soft decision value (=1 in case of hard decision). The Deinterleaver_memory=(55296*120)/16*N=405 Kbits*N.

As the number of bits per soft decision increases, Viterbi decoder 206 performance is improved because the more bits a soft decision has, the more information it carries. Such information is used by the Viterbi decoder 206 to estimate the data more accurately. However, deinterleaver memory 207 size increases. An increase of 1 bit in the number of bits per soft decision value corresponds to an increase of 405 Kbits in the deinterleaver memory 207. This means that there is a trade-off between the Viterbi decoder 206 performance and the deinterleaver 105 memory size.

The deinterleaver memory 207 calculated above is for an extreme case where the entire CIF is occupied either with one or with many subchannels that needs to be decoded simultaneously. A typical case is that in which a mobile TV user watches only one TV program at a given time, which translates to typically one subchannel that occupies approximately one third of the entire CIF. Accordingly, the receiver 200 is designed to accommodate these extreme cases by carrying sufficient memory that is adequate to receive the entire CIF. For example, if the receiver 200 is designed to have N=4, then a deinterleaver memory 207 of approximately 1.6 Mbits (405 Kbits*4) is required. Now, assuming that only one subchannel is occupying half of the CIF, this means that the actual memory required=(1/2*55296*120)/16*N=1/2*405 K*4=0.8 Mbits. This, in turn, means that memory utilization=50%. This example shows that the memory required for the extreme case is double the memory required for the typical case. Thus, half of the memory carried by the receiver is not utilized most of the time. Whereas, the receiver 200 provided by the embodiments herein uses this underutilized memory to enhance the performance of typical cases.

The embodiments herein set the value of N variable according to the subchannel allocation. This occurs by adapting the value of N such that all the memory in the receiver 200 is fully utilized to achieve better receiver performance. In the previous example, where the subchannel occupies only half the CIF, the value of N is programmed to 8. In this way, the unused part of the memory is utilized and the Viterbi decoder 206 performance is significantly improved. The unused memory is used to increase the number of bits in the soft decisions at the input to the Viterbi decoder 206, which enhances the accuracy of these soft decisions thus enhancing the performance of the Viterbi decoder 206.

Figure 2:
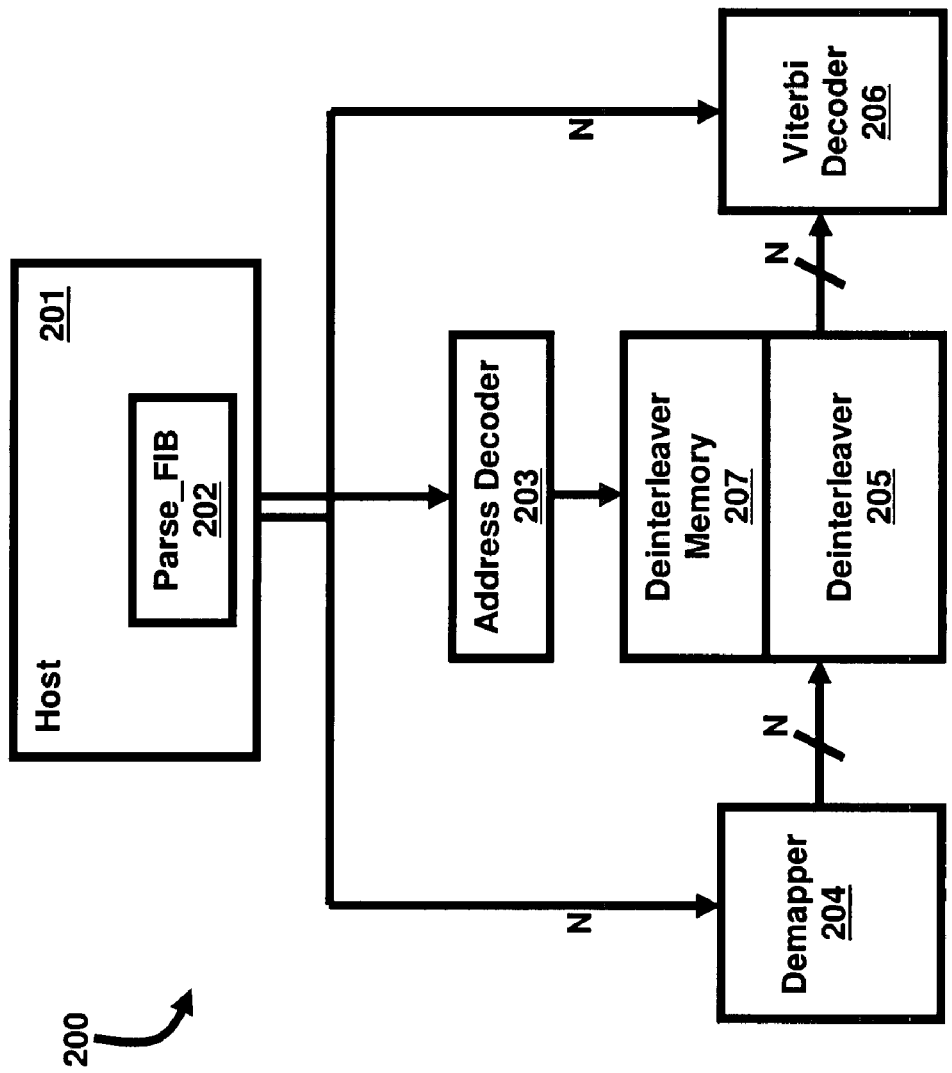
FIG. 2 illustrates a schematic diagram of receiver according to an embodiment herein.

The embodiments herein provide an improved receiver 200 as shown in FIG. 2. The host processor 201 receives the Fast Information Blocks (FIBs) which contains information about the channel allocation. The host 201 parses (202) the FIBs to extract information about the actual channel allocation. Then, the host 201 estimates the number of bits per soft decision (N) by dividing the total receiver available memory size by the number of soft bits for the received subchannels. This value N is then fed to the demapper 204, the Viterbi decoder 206, and the memory address decoder 203. The address decoder 203 controls how soft decisions are read from the deinterleaver memory 207 and fed to the deinterleaver 205 and finally to the Viterbi decoder 206.

The deinterleaver memory 207 size is designed corresponding to the number of bits per soft decision that guarantees a good performance for the case when one subchannel occupies the entire CIF (which is N=4 for T-DMB). Again, the host processor 201 first parses (202) the FIBs, which contain information about channel organization, to get the subchannel organization and then sets the number of bits per soft decision (N) (that is sent to both the demapper 204 and the Viterbi decoder 206) and controls memory allocation. If one subchannel occupies the entire CIF, N will be equal to 4 and the entire memory will be utilized. If, for example, one subchannel occupies half the CIF, N will be increased to 8 to get a better performance and utilize the entire memory as mathematically verified above. If there is more than one subchannel, the host processor 201 divides the available memory between the different subchannels and in this case the performance will be degraded due to the decrease of the number of bits per soft decision but the required subchannels are decoded (203) with the same memory requirement.

The same scenario applies for ISDB-T (one and three segment receiver) where a receiver 200 has sufficient memory to receive three segments of the RF channel bandwidth with N bits per soft decision. In ISDB-T, the RF channel bandwidth is frequency division multiplexed into thirteen segments. In most cases the receiver will receive only one segment thus it could allocate 3×N bits to each soft decision in this case to enhance the one segment receiver performance. More specifically, ISDB-T channel bandwidth is divided in the frequency domain into segments of spectrum. Each segment carries different content than other segments. In such systems, mobile receivers 200 have to receive three segments for mobile sound broadcast and one segment for mobile TV broadcast. Thus, the receiver 200 in general has to have sufficient memory to receive three segments. In the cases where the receiver 200 is receiving only one segment, two thirds of the memory is not utilized. Such memory could be used to enhance the performance of the Viterbi decoder 206 because this memory is then reallocated to the Viterbi decoder 206.

Figure 3:
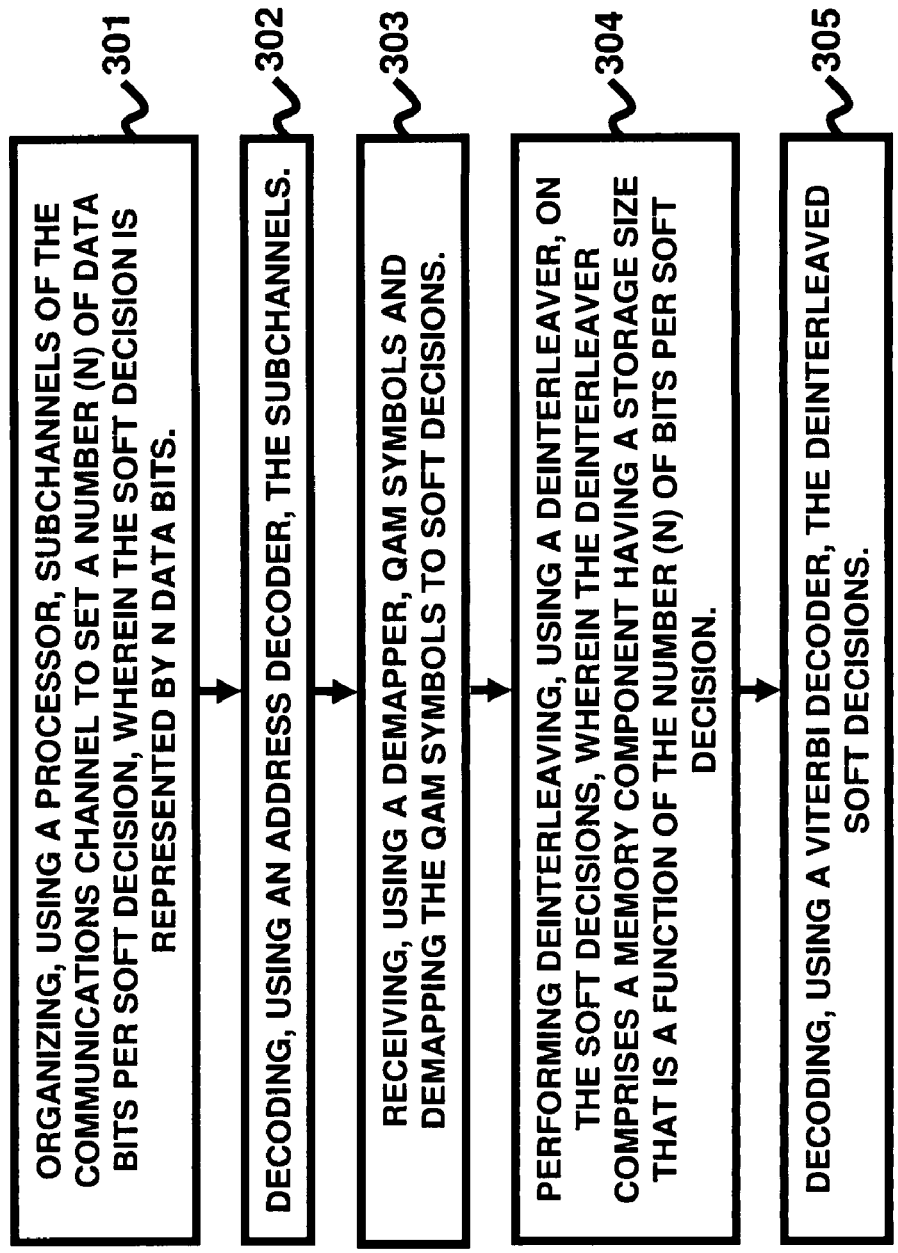
FIG. 3 is a flow diagram illustrating a preferred method according to an embodiment herein.

FIG. 3 is a flow diagram illustrating a method of allocating deinterleaver memory usage in a receiver 200 used in a wireless network comprising a communications channel, wherein the method comprises organizing (301), using a processor 201, subchannels of the communications channel to set a number (N) of data bits per soft decision, wherein the soft decision is represented by N data bits; decoding (302), using an address decoder 203, the subchannels; receiving (303), using a demapper 204, QAM symbols and demapping the QAM symbols to soft decisions; performing deinterleaving (304), using a deinterleaver 205, on the soft decisions, wherein the deinterleaver 205 comprises a memory component 207 having a storage size that is a function of the number (N) of bits per soft decision; and decoding (305), using a Viterbi decoder 206, the deinterleaved soft decisions.

The wireless network may comprise a MSC network. Alternatively, the wireless network may comprise an ISDB-T network, wherein in the ISDB-T network, when the receiver 200 receives only one segment of channel spectrum, all unutilized memory is allocated to the Viterbi decoder 206. The method may further comprise organizing the subchannels such that one subchannel occupies an entire CIF of the communications channel, wherein the method may further comprise programming N to be equal to 4. Additionally, the method may further comprise organizing the subchannels such that one subchannel occupies less than an entire CIF of the communications channel, wherein when the one subchannel occupies half of the entire CIF, then the method may further comprise programming N to be equal to 8. Preferably, a value of the number (N) of bits per soft decision is variable according to the organization of the subchannels to CIFs of the communications channel. Moreover, the method may further comprise dividing a total amount of the memory size amongst multiple subchannels.

The embodiments herein include both hardware and software elements. Preferably, the software embodiments include, but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments herein is depicted in FIG. 4. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A receiver for use in a wireless network comprising a communications channel, said receiver comprising:
    a processor adapted to organize subchannels of said communications channel and set a number (N) of data bits per soft decision, wherein said soft decision is represented by N data bits;
    an address decoder adapted to decode said subchannels;
    a demapper adapted to receive quadrature amplitude modulation (QAM) symbols and demap said QAM symbols to soft decisions;
    a deinterleaver adapted to perform deinterleaving on said soft decisions, wherein said deinterleaver comprises a memory component having a storage size that is a function of said number (N) of bits per soft decision; and
    a Viterbi decoder adapted to decode the deinterleaved soft decisions.

2. The receiver of claim 1, wherein said wireless network comprises a Main Service Channel (MSC) network.

3. The receiver of claim 1, wherein said wireless network comprises an Integrated Services Digital Broadcasting-Terrestrial (ISDB-T) network, and wherein when said receiver receives only one segment of channel spectrum, all unutilized memory is allocated to said Viterbi decoder.

4. The receiver of claim 1, wherein said processor is adapted to organize said subchannels such that one subchannel occupies an entire common interleaved frame (CIF) of said communications channel.

5. The receiver of claim 4, wherein said processor is adapted to program N to be equal to 4.

6. The receiver of claim 1, wherein said processor is adapted to organize said subchannels such that one subchannel occupies less than an entire common interleaved frame (CIF) of said communications channel.

7. The receiver of claim 6, wherein when said one subchannel occupies half of said entire CIF, then said processor is adapted to program N to be equal to 8.

8. The receiver of claim 1, wherein a value of said number (N) of bits per soft decision is variable according to the organization of said subchannels to common interleaved frames (CIFs) of said communications channel.

9. The receiver of claim 1, wherein said processor is adapted to divide a total amount of said memory size amongst multiple subchannels.

10. A receiver for use in a wireless network comprising a communications channel, said receiver comprising:
    a host processor adapted to:
        receive Fast Information Blocks (FIBs) from said communications channel, wherein said FIBs contain information about channel allocation;
        parse said FIBs to extract information about an actual channel allocation; and
        estimate a number of bits per soft decision (N) by dividing a total receiver available memory size by a number of soft bits for received subchannels of said communications channel;
    an address decoder adapted to decode said subchannels;
    a demapper adapted to receive quadrature amplitude modulation (QAM) symbols and demap said QAM symbols to said soft decisions (N);
    a deinterleaver memory adapted to store said soft decisions (N), wherein a size of said deinterleaver memory corresponds to said number of bits per soft decision (N) when one subchannel occupies an entire common interleaved frame (CIF) of said communications channel;
    a deinterleaver adapted to perform deinterleaving on said soft decisions (N); and
    a transmission link adapted to send said number of bits per soft decision (N) to said demapper, a Viterbi decoder, and said address decoder,
    wherein said address decoder is adapted to control how said soft decisions (N) are read from said deinterleaver memory and fed to said deinterleaver and said Viterbi decoder, and wherein said Viterbi decoder is adapted to decode the deinterleaved soft decisions.

11. The receiver of claim 10, wherein said wireless network comprises any of a Main Service Channel (MSC) network and an Integrated Services Digital Broadcasting-Terrestrial (ISDB-T) network, and wherein in said ISDB-T network, when said receiver receives only one segment of channel spectrum, all unutilized memory is allocated to said Viterbi decoder.

12. A method of allocating deinterleaver memory usage in a receiver used in a wireless network comprising a communications channel, said method comprising:
    organizing, using a processor, subchannels of said communications channel to set a number (N) of data bits per soft decision, wherein said soft decision is represented by N data bits;
    decoding, using an address decoder, said subchannels;
    receiving, using a demapper, quadrature amplitude modulation (QAM) symbols and demapping said QAM symbols to soft decisions;
    performing deinterleaving, using a deinterleaver, on said soft decisions, wherein said deinterleaver comprises a memory component having a storage size that is a function of said number (N) of bits per soft decision; and
    decoding, using a Viterbi decoder, the deinterleaved soft decisions.

13. The method of claim 12, wherein said wireless network comprises a Main Service Channel (MSC) network.

14. The method of claim 12, wherein said wireless network comprises an Integrated Services Digital Broadcasting-Terrestrial (ISDB-T) network, and wherein when said receiver receives only one segment of channel spectrum, all unutilized memory is allocated to said Viterbi decoder.

15. The method of claim 12, further comprising organizing said subchannels such that one subchannel occupies an entire common interleaved frame (CIF) of said communications channel.

16. The method of claim 15, further comprising programming N to be equal to 4.

17. The method of claim 12, further comprising organizing said subchannels such that one subchannel occupies less than an entire common interleaved frame (CIF) of said communications channel.

18. The method of claim 17, wherein when said one subchannel occupies half of said entire CIF, then said method further comprising programming N to be equal to 8.

19. The method of claim 12, wherein a value of said number (N) of bits per soft decision is variable according to the organization of said subchannels to common interleaved frames (CIFs) of said communications channel.

20. The method of claim 12, further comprising dividing a total amount of said memory size amongst multiple subchannels.

* * * * *